(12) United States Patent
Aegerter

(10) Patent No.: US 11,806,868 B2
(45) Date of Patent: Nov. 7, 2023

(54) BOOM WORKING DEVICE

(71) Applicant: Festo SE & Co. KG, Esslingen (DE)

(72) Inventor: Markus Aegerter, Altbach (DE)

(73) Assignee: Festo SE & Co. KG, Esslingen (DE)

( * ) Notice: Subject to any disclaimer, the term of this patent is extended or adjusted under 35 U.S.C. 154(b) by 243 days.

(21) Appl. No.: 17/473,316

(22) Filed: Sep. 13, 2021

(65) Prior Publication Data

US 2022/0080583 A1 Mar. 17, 2022

(30) Foreign Application Priority Data

Sep. 14, 2020 (DE) .......................... 102020211506.0

(51) Int. Cl.
| | |
|---|---|
| *B25J 9/04* | (2006.01) |
| *B66C 23/02* | (2006.01) |
| *B25J 9/10* | (2006.01) |
| *B66C 23/84* | (2006.01) |
| *B66C 13/22* | (2006.01) |

(52) U.S. Cl.
CPC ............. *B25J 9/045* (2013.01); *B25J 9/1035* (2013.01); *B66C 13/22* (2013.01); *B66C 23/02* (2013.01); *B66C 23/84* (2013.01)

(58) Field of Classification Search
CPC ......... B25J 9/045; B25J 9/1035; B66C 13/22; B66C 23/02; B66C 23/84
See application file for complete search history.

(56) References Cited

U.S. PATENT DOCUMENTS 4,256,218 A * 3/1981 Gerben .................. B65G 25/02
414/751.1
2014/0174240 A1 6/2014 Peng et al.

FOREIGN PATENT DOCUMENTS

| CN | 104260108 A | 1/2015 |
|---|---|---|
| CN | 107639631 A | 1/2018 |
| DE | 10349452 A1 | 5/2005 |
| DE | 102017215942 A1 | 3/2019 |

* cited by examiner

*Primary Examiner* — Saul Rodriguez
*Assistant Examiner* — Brendan P Tighe
(74) *Attorney, Agent, or Firm* — Hoffmann & Baron, LLP

(57) ABSTRACT

A boom working device has a boom, mounted on and extending from a boom support, on which an end effector mounting interface is formed. The boom is equipped with two linear output structures, each in engagement with one of two drive wheels of the boom support. With respect to the boom support, the boom is both pivotable around a main axis and also capable of linear movement at right-angles to the main axis. Through harmonised rotary actuation of the drive wheels an operating movement of the boom may be generated, consisting either of a pivoting movement alone or of a linear movement alone or of the pivoting movement with simultaneously superimposed linear movement.

21 Claims, 7 Drawing Sheets

BOOM WORKING DEVICE

BACKGROUND OF THE INVENTION

The invention relates to a boom working device with a boom support which has a main axis, and a boom having at least one end effector mounting interface and extending along a boom longitudinal axis orthogonal to the main axis, wherein the whole boom is pivotable, in a working plane orthogonal to the main axis relative to a boom support base body of the boom support, while executing a boom pivoting movement around the main axis as pivoting centre, and with a boom drive unit to generate an operating movement of the boom relative to the boom support in the working plane.

A boom working device of this kind is in the form of a SCARA-type robot in DE 10 2017 215 942 A1. The known robot has a pedestal unit on which a boom support may traverse vertically and carries a boom-like horizontally protruding articulated arm, which is pivotable relative to a vertical main axis of the boom support, in order to shift and position an end effector mounting interface, fitted to the articulated arm and in operation equipped with an end effector, into a working plane at a right-angle to the main axis. So as to be able to approach with the end effector mounting interface any points in space in the working plane, the articulated arm is subdivided into several arm elements, hinged together and pivotable relative to one another. The arm joints positioned between adjacent arm segments are each equipped with a rotary drive unit, so that the arm segments may be actively pivoted relative to one another in the working plane. In this known working device, the technical complexity in drive terms is relatively high. Moreover, on account of the rotary drive units to be integrated, the articulated arm functioning as boom has a relative high weight.

SUMMARY OF THE INVENTION

The invention is based on the problem of creating a boom working device which, with a simple and cost-effective design and low weight of the boom, facilitates variable positioning of the end effector mounting interface in a working plane.

To solve this problem it is provided according to the invention for a boom working device, in conjunction with the features referred to above,
  that the whole boom is linearly displaceable in the working plane relative to the boom support base body, while executing a boom linear movement in the axial direction of the boom longitudinal axis,
  that on the boom support base body, two first and second drive wheels of the boom support, coaxial to the main axis, are rotatably mounted in a manner rotatable with respect to the boom support base body around the main axis as rotation axis, wherein the first drive wheel has on its outer periphery a first drive structure lying on a circle line coaxial to the main axis and the second drive wheel has on its outer periphery a second drive structure lying on a circle line coaxial to the main axis,
  that the boom has two linear first and second output structures extending parallel to the boom longitudinal axis, wherein the first output structure, in a first engagement area, is in force-transmitting engagement with the first drive structure, and wherein the second output structure, in a second engagement area, is in force-transmitting engagement with the second drive structure, wherein the first engagement area and the second engagement area are assigned to diametrically opposite outer peripheral areas of the two drive gearwheels,
  and that the two drive wheels may be driven by the boom drive unit, independently of one another, respectively to a driving rotary movement in a first direction of rotation and in a second direction of rotation opposite to the former, and may be held non-rotatably in any desired rotary position, by which means the operating movement of the boom is generatable, consisting either of the boom pivoting movement alone or of the boom linear movement alone or being composed of the boom pivoting movement and of the simultaneously superimposed boom linear movement.

In this way, an end effector mounting interface located on the boom and equipped, in operation of the boom working device, with an application-specific end effector, may be shifted and positioned variably in the working plane, without the need for joint structures and rotary drive units integrated in the boom. The boom may therefore be made extremely weight-saving, which offers high load-bearing capacity and permits high accelerations to execute the operating movement. To generate the operating movement the whole boom, while executing a boom linear movement in the axial direction of the boom longitudinal axis and/or while executing a boom pivoting movement, may be pivoted around the main axis which defines a rotation axis. The boom linear movement and the boom pivoting movement may in each case be generated for themselves or also superimposed, in order to move the end effector mounting interface along a desired path curve in the working plane. Causal for the operating movement are two drive wheels, capable of rotary driving, independently of one another, through a drive unit described as boom drive unit. For better distinction, the drive wheels are described as first and second drive wheel, each capable of rotary driving in a first direction of rotation and in a second direction of rotation opposite to the former, i.e. both clockwise and anti-clockwise. For this purpose the boom drive unit allows as required a temporary non-rotatable holding of one or both drive wheels. Each drive wheel cooperates for driving purposes with one of two linear output structures of the boom, which for better distinction are described as first and second output structures. Through the mutual engagement on the one hand of the first drive structure with the first output structure and on the other hand of the second drive structure with the second output structure, the drive wheels are able to transmit a drive force, effective in the axial direction of the boom longitudinal axis, on the linear output structures of the boom. Depending on the momentary set operating mode of the drive wheels, i.e. either rotating or static, the desired operating movement results. The two drive wheels may be driven simultaneously both with the same direction of rotation or with opposite directions of rotation, while the boom drive unit is preferably so designed that the driving rotary movements of the two drive wheels may be executed, also at different speeds of rotation, irrespective of the chosen direction of rotation, so that in each case one drive wheel rotates faster than the other drive wheel. In order to hold temporarily unchanged a momentary operating position of the boom and of the end effector mounting interface attached to it, the two drive wheels may be held simultaneously non-rotatable by the boom drive unit.

The end effector mounting interface is designed to fix an application-specific end effector for a working process in a preferably releasable manner Such an engagement may be for example a gripper, a measuring instrument or a welding device. Irrespective of the design of the boom working device, an end effector may be attached to the end effector mounting interface directly or indirectly with the interposition of an additional structure, for example a mounting adapter. The boom working device is very suitable for handling tasks and may for example represent a robot which can be used for a variety of tasks.

In a simple embodiment, the boom is equipped with just a single end effector mounting interface, but may readily have several end effector mounting interfaces available. For example the boom may be so designed that it extends beyond the boom support on opposite sides with one boom end section in each case, and in the area of both boom end sections an end effector mounting interface is provided.

The working area in which the end effector mounting interface may be moved by means of the operating movement is preferably defined by a circular surface or circular ring surface lying in the working plane. The shape of the working area depends primarily on the placing of the end effector mounting interface. A circular ring surface as working area results preferably when the end effector mounting interface is located on the long side of the boom facing the boom support. If the end effector mounting interface is located on the opposite long side of the boom, facing away from the boom support then expediently, through the operating movement, a circular working area may be traversed.

Advantageous developments of the invention are disclosed in the dependent claims.

The drive structures of the two drive wheels are expediently arranged next to one another in the axial direction of the main axis. The two drive wheels expediently overlap in the main axis, for the purpose of mutual centring and support. The two linear output structures expediently extend with the same offset as the drive structures in planes parallel to one another.

The two drive structures and the two linear output structures are preferably in the form of tooth systems engaging in one another. This permits extremely precise positioning with the possibility of transmitting very high driving forces. In principle, though, a design for frictional force-transmitting engagement would also be possible.

The two linear output structures are preferably formed on racks of the boom. These racks are in particular separate components relative to a boom base body of the boom, and are secured to the boom base body by suitable measures such as screw connections.

The two drive wheels of the boom support are preferably in the form of gearwheels with an outer tooth system forming the assigned drive structure. The two gearwheels are expediently axially consecutive in coaxial alignment, expediently supporting one another.

The boom drive unit preferably has two drive units, operable independently of one another and, for better distinction, described as first and second drive unit. They are in particular electrically operable drive units, having for example an electrical step motor or an electrical servomotor. Alternatively, they may be drive units operable by fluid power or in the form of hybrid drive units.

Expediently the boom working device contains an electronic control unit for control of the two drive units. The first drive unit is for driving purposes coupled to the first drive wheel, while the second drive unit is for driving purposes coupled to the second drive wheel.

The boom working device is in particular so designed that the two drive wheels may be driven by the two drive units to rotate in the same direction or in opposite directions, and specifically not only in any desired time sequence but also simultaneously. Also possible, expediently, is operation at the same or different speeds of rotation. The drive units are preferably so designed that they are able to stop the assigned drive wheel in any desired rotary position, and to hold it non-rotatably for as long as desired. For non-rotatable holding, the drive units may if required each be equipped with a locking brake.

For driving interaction with the drive units, each drive wheel expediently has an inner tooth system, coaxial to the main axis of the boom support, with which the respectively assigned drive unit is in meshing engagement. For example each drive unit has a rotationally drivable drive pinion which engages in one of the two inner tooth systems.

The two drive units are preferably mounted on the boom support base body. They do not therefore accompany the operating movement of the boom.

Preferably the boom is mounted with linear movement capability in a direction perpendicular to the main axis, for which purpose a linear guidance device accompanying the boom pivoting movement is provided. By this means the boom is supported reliably, irrespective of the current swivel position, against forces acting transversely to the working plane.

The boom support expediently has a support element, separate from the boom support base body, which is rotatably mounted around the main axis acting as rotation axis. The rotary support is effected in particular independently of the two drive wheels.

The linear guidance device preferably has a guide rail assembly which is part of the boom and is in engagement with guide structures located on the support element for being capable of linear movement in the axial direction of the boom longitudinal axis.

It has proved to be advantageous if the guide rail assembly has two guide rails, each extending parallel to the boom longitudinal axis and spaced apart from one another in the direction of extension of the working plane, i.e. at a right-angle to the main axis. They have preferably the same length and lie opposite one another. Each guide rail may be a single part or multi-part in form. Each guide rail is expediently in engagement, with linear movement capability, with at least one guide shoe belonging to the guide structures and firmly attached to the support element. Preferably each guide rail cooperates with two guide shoes spaced apart in the axial direction of the boom longitudinal axis. The guide shoes are preferably in the form of slide shoes, but may also be designed as roller bearing shoes.

The boom has in particular an elongated boom base body, on which the end effector mounting interface or interfaces is or are located. The end effector mounting interface may be positioned as desired, while it is however advantageous if it is located on one of the two long sides of the boom base body oriented in the axial direction of the main axis.

The boom base body is preferably a hollow body, in the interior of which the two linear output structures are mounted. The advantageous guide rail assembly is expediently fastened to the boom base body, wherein it is preferably likewise located in the interior of the boom base body.

Preferably the boom has two first and second boom end sections, opposite one another in the axial direction of the boom longitudinal axis. The boom is able to traverse between two axial end positions in which in each case one of the two boom end sections lies in the area of the boom support. Preferably at least one end effector mounting interface is located in the area of one of the two boom end sections.

The boom support may, in operation of the boom working device, be fixed immovably in any desired manner, for example to a support wall or to a support frame. In an especially advantageous variant, the boom working device has a base unit which is or may be fixed to a foundation, and on which the boom support is so mounted that it can execute a linear stroke movement relative to the base unit in the axial direction of the main axis. A preferred available boom support drive unit allows the generation of the aforementioned stroke movement, in order to be able to position the boom support, and therefore also the boom attached to it, in different stroke positions. In this way the working plane may be shifted parallel in the axial direction of the main axis. In this way, the working area which may be covered by the end effector mounting interface is considerably enlarged.

Preferably the boom working device is so designed that the stroke movement of the boom support may be executed independently of the operating movement of the boom. The two movements may therefore be executed consecutively as well as simultaneously.

The boom working device is preferably equipped with an electronic control unit which is designed to control the boom drive unit together with the boom support drive unit which is preferably also present.

BRIEF DESCRIPTION OF THE DRAWINGS

The invention is explained in detail below with the aid of the appended drawing, which shows in.

DETAILED DESCRIPTION

Figure 1:
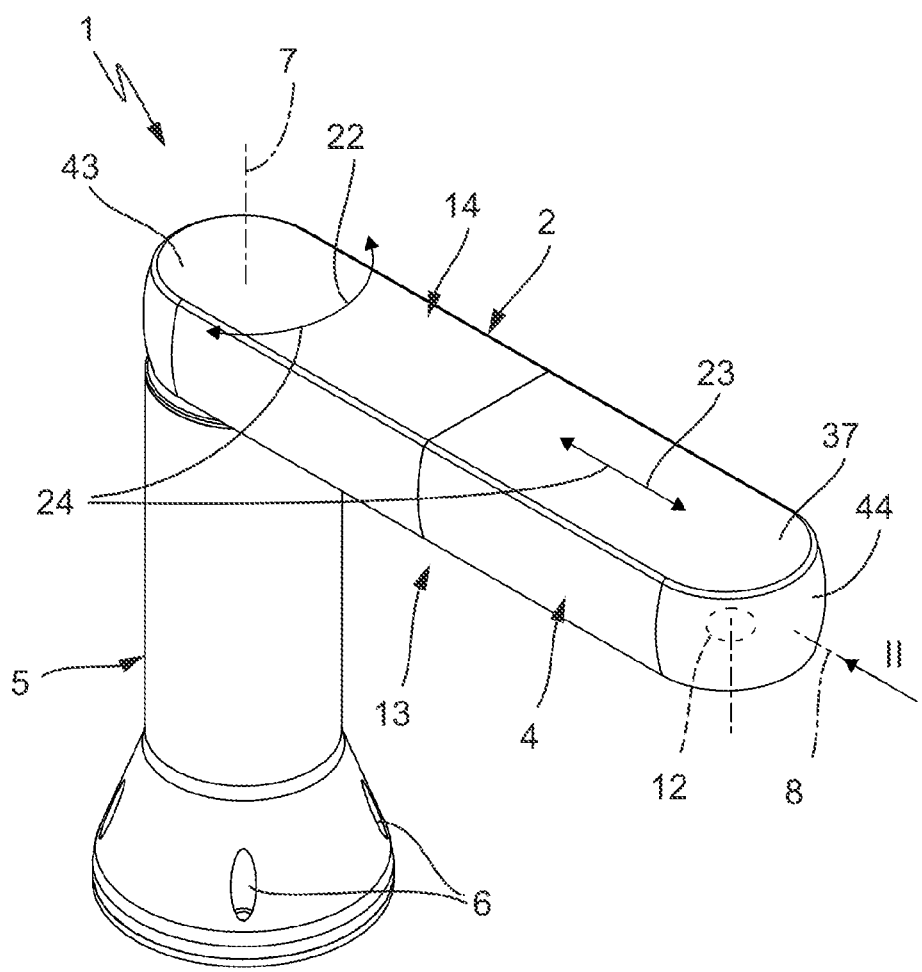
FIG. 1 a preferred variant of the boom working device according to the invention in an isometric view FIG. 2 a front view of the boom working device with direction of view according to arrow II of FIG. 1 and at the same time halved in longitudinal section corresponding to section line II-II of FIG. 3
Figure 2:
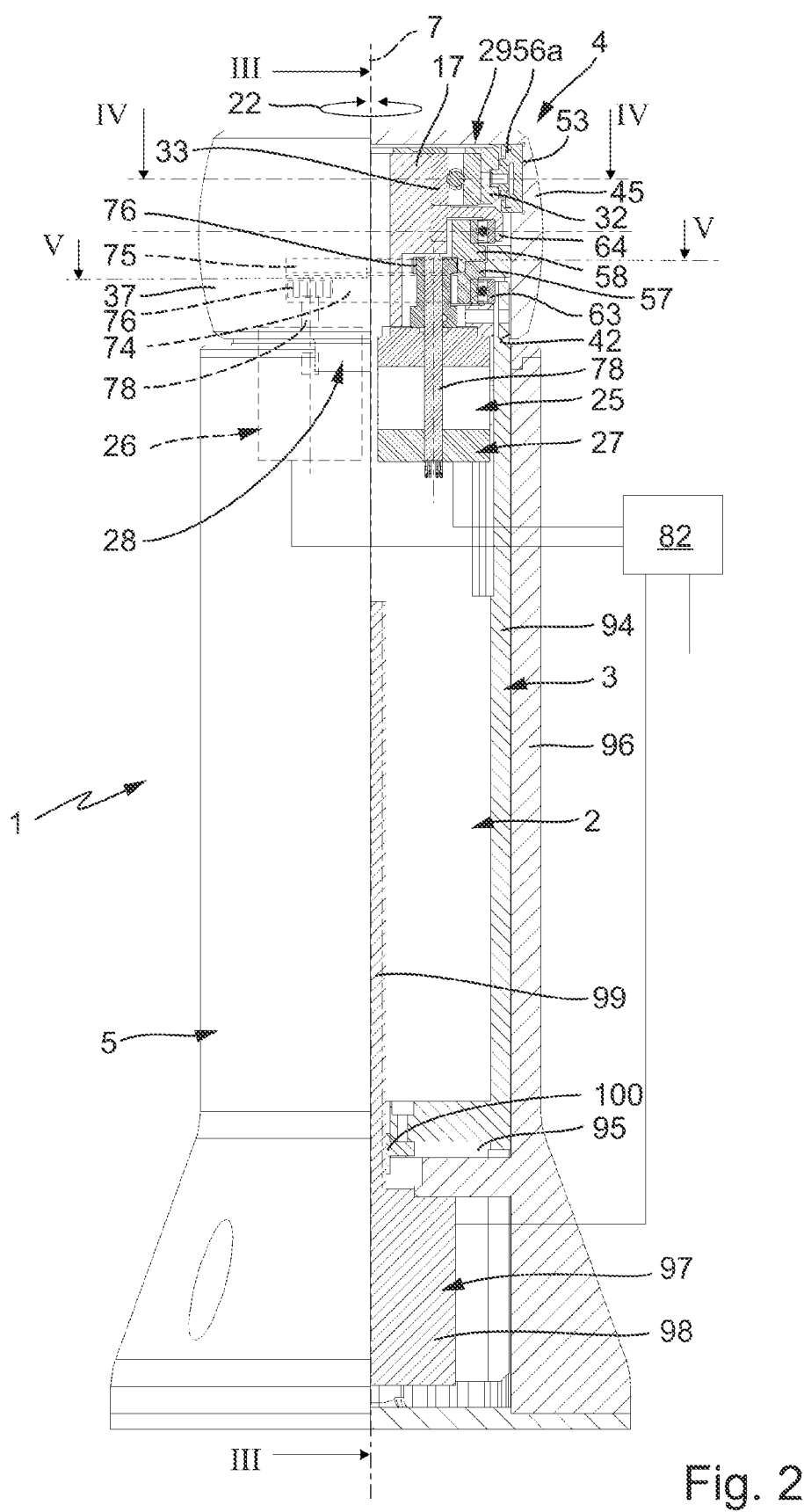

The boom working device 1 according to the invention, depicted by way of example in the drawing, expediently has an operating unit 2 which has a boom support 3 and a boom 4 supported by the boom support 3.

The boom support 3 may be provided with a mounting device, by means of which it may be fixed at the point of use to a suitable external support structure, for example to a support wall or a support frame. Preferably, though, the boom working device 1 is equipped with an additional base unit 5 which is designed for fixing at the point of use and is fixed to the operating unit 2 via the boom support 3. The base unit 5 has a base mounting interface 6 with which, in standby mode of the boom working device 1, it is fastened to an external support structure, for example to a foundation of a production building.

The boom support 3 extends along an imaginary main axis 7. In a preferred state of use of the boom working device 1, which is illustrated in the drawing, the main axis 7 extends vertically.

The boom 4 has a longitudinal extent with a boom longitudinal axis 8. The boom longitudinal axis 8 runs orthogonally to the main axis 7, expediently intersecting the main axis 7. The boom 4 therefore by way of example extends horizontally from the boom support 3.

Formed on the boom 4 is an end effector mounting interface 12. It is usually found at a radial distance from the boom support 3 with respect to the main axis 7. The boom 4 has a lower long side 13, oriented in the axial direction of the main axis 7, by way of example facing the base unit 5, together with an upper long side 14 opposite the former. Preferably the end effector mounting interface 12 is located on the lower long side 13, but may however also readily be placed on the upper long side 14 or at another point on the boom 4, for example also at the end.

Varying from the illustrated embodiment, the boom 4 may have several end effector mounting interfaces 12.

Figure 3:
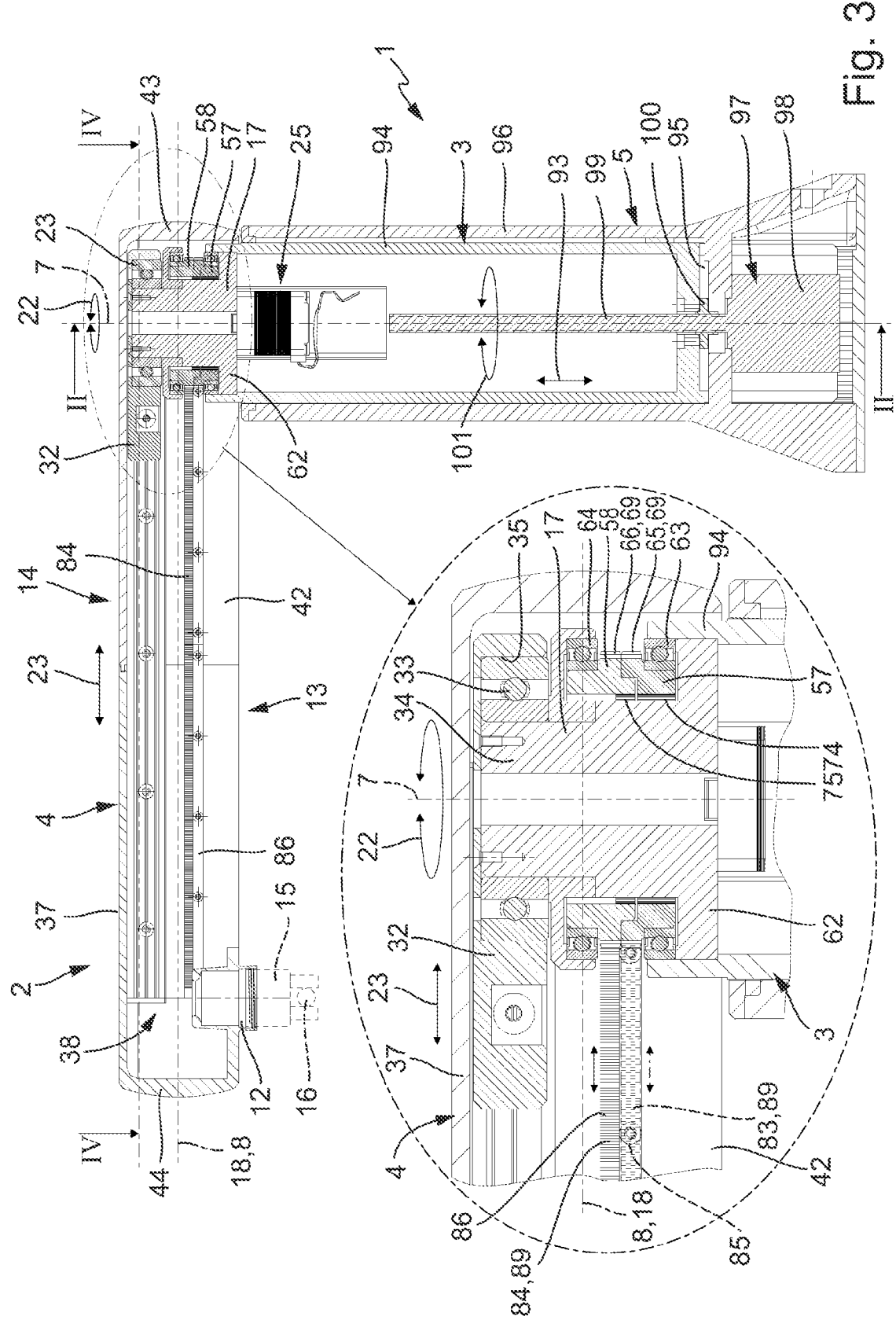
FIG. 3 a longitudinal section of the boom working device according to section line of FIG. 2, wherein a detail surrounded by dot-dash lines is also separately further enlarged FIG. 4 a longitudinal section according to section line IV-IV of FIGS. 2 and 3
Figure 4:
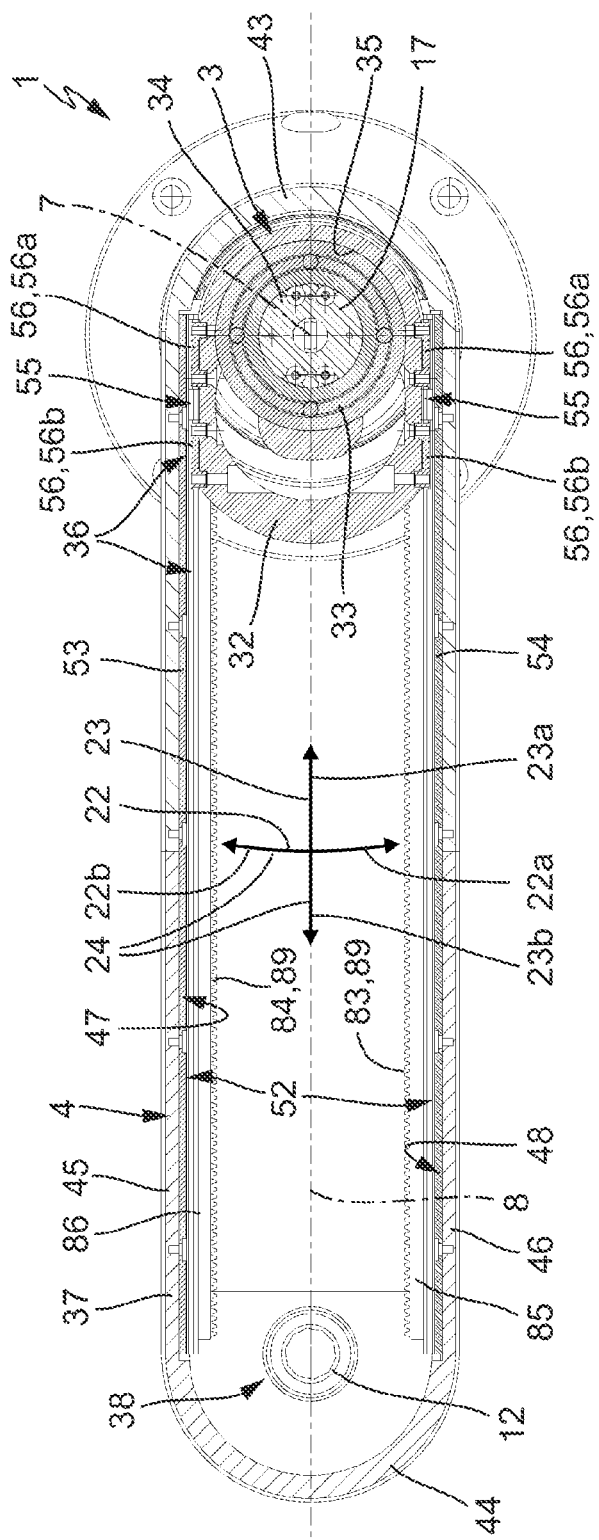

The end effector mounting interface 12 is designed for the attachment to it of an end effector 15, indicated in FIG. 3 by broken lines, with which a task is to be performed. The end effector 15 is application-specific and may for example be a gripper, with which objects 16 may be gripped and repositioned.

The end effector mounting interface 12 is preferably designed for releasable fixing of an end effector 15, so that an end effector changeover may take place at any time. Alternatively it may also be provided that the end effector 15 is attached non-releasably to the end effector mounting interface 12.

The boom support 3 has a boom support base body 17. The whole boom 4 may be pivoted around the main axis 7 relative to the boom support base body 17, in a working plane 18 orthogonal to the main axis 7. The pivoting movement of the boom 4 which then takes place is described as the boom pivoting movement 22 and may be effected either in a first pivoting direction 22a or in a second pivoting direction 22b opposite to the former, i.e. either clockwise or anti-clockwise. The main axis 7 forms the pivoting centre or the pivot axis for the boom pivoting movement 22.

Independently of the boom pivoting movement 22, the whole boom 4 is traversable linearly relative to the boom support base body 17 in the working plane 18. The linear movement possible here is oriented in the axial direction of the boom longitudinal axis 8 and is described as the boom linear movement 23. The boom linear movement 23 may be effected either in a first linear direction 23a or in a second linear direction 23b opposite to the former.

In the case of the pure boom linear movement 23, the distance of the end effector mounting interface 12 relative to the main axis 7 is changed. With the pure boom pivoting movement 22, this distance remains constant and the end effector mounting interface 12 moves along a circular arc, so that only the angular position of the end effector mounting interface 12 assumed in its circumferential direction relative to the main axis 7 is changed. The position assumed by the end effector mounting interface 12 is described as the operating position.

By executing the boom pivoting movement 22 and the boom linear movement 23, and specifically either consecutive in time or simultaneously superimposed, the operating position of the end effector mounting interface 12 may vary two-dimensionally within the working plane 18. An operating movement 24 which may be executed by the boom 4 therefore comprises either only the boom pivoting movement 22 or only the boom linear movement 23 or is comprised of the boom pivoting movement 22 together with the boom linear movement 23 simultaneously superimposed on the former.

To generate the operating movement 24, the boom working device 1 is equipped with a boom drive unit 25. The boom drive unit 25 is by way of example an electrical boom drive unit 25, but may readily also be in the form of a fluid-operated or electro-fluidic drive unit.

Preferably the boom drive unit 25 is a rotary drive unit.

The boom drive unit 25 comprises preferably two drive units 26, 27, independent of one another and which for better distinction are also described as first drive unit 26 and second drive unit 27.

The boom drive unit 25 is expediently mounted on the boom support base body. By way of example, this applies to the two drive units 26, 27. The boom support base body 17 has a lower side 28 oriented in the axial direction of the main axis 7 which, by way of example, faces the base unit 5. The boom drive unit 25 is preferably attached to the boom support base body 17 in the area of the lower side 28.

The pivotable support of the boom 4 with respect to the boom support base body 17 is effected expediently with the interposition of a support element 32 of the boom support 3, separate from the boom support base body 17. The support element 32 is mounted rotatably on the boom support base body 17 around the main axis 7, while the boom 4 is mounted, unable to swivel, on the support element 32. Thus the support element 32 and the boom 4 form a swivel unit, always executing the boom swivelling movement 22 in a uniform manner.

The support element 32 is preferably plate-shaped, with a plate plane aligned parallel to the working plane 18. Preferably the support element 32 is rotatably mounted on the boom support base body 17 in the area of an upper side 29 of the boom support base body 17, axially opposite the lower side 28. Through this rotary bearing, the support element 32 experiences at the same time support, so that its rotational mobility represents the sole degree of freedom of movement relative to the boom support base body 17.

Provided for the rotary support of the support element 32 is for example an anti-friction bearing 33, designated for better distinction as first anti-friction bearing 33; this rests with its inner ring on a bearing support 34 of the boom support base body 17 and, on its outer ring, with a bearing recess 35, it is slipped over and for example pressed on to the support element 32.

The fixing of the boom 4 on the support element 32 is effected by means of a linear guidance device 36 accompanying the support element 32. The linear guidance device 36 is provided to facilitate the boom linear movement 23, wherein the boom 4, by means of the linear guidance device 36, is movably mounted relative to the support element 32 and therefore also relative to the boom support base body 17, perpendicular to the main axis 7, and can thus execute the boom linear movement 23. During the boom linear movement 23, the boom 4 moves not only relative to the boom support base body 17, but also relative to the support element 32.

The boom 4 has a boom base body 37, which preferably has an elongated shape, while extending along the boom longitudinal axis 8. By way of example, the boom base body 37 is in the form of a hollow body which encompasses, at least partly, a base body interior 38. The boom base body 37 extends expediently at the upper side 29 beyond the boom support base body 17. It is advantageous when the boom base body 37 is hood-shaped, corresponding to the illustrated embodiment, and the area of the lower long side 13 has a slit-like opening 42, through which the boom support 3 extends with the boom support base body 17 into the base body interior 38. The width of the slit-like opening 42 is so dimensioned that the boom 4 can execute its boom linear movement 23 without hindrance by the boom support 3. In the course of the boom linear movement 23, the axial position of the boom support base body 17 changes relative to the boom 4, within the slit-like opening 42.

The boom base body 37 has a first axial end section 43, and a second axial end section 44 spaced apart from the former in the axial direction of the boom longitudinal axis 8. The slit-like opening 42 begins by way of example in the area of the first axial end section 43 and extends as far as the second axial end section 44, while the end effector mounting interface 12 is for example located at the second axial end section 44, axially adjacent to the slit-like opening 42.

The boom base body 37 has two side walls 45, 46, opposite in the direction of the boom pivoting movement 22. The two side walls 45, 46 have facing inner faces 47, 48.

The linear guidance device 36 has a guide rail assembly 52 which has two guide rails 53, 54, each having a linear longitudinal extent and attached in each case to one of the two inner faces 47, 48 of the side walls 45, 46, for example by means of fixing bolts. The two guide rails 53, 54 extend parallel to the boom longitudinal axis 8 and are spaced apart from one another in the direction of extension of the working plane 18 and at the same time, to be more precise, in the pivoting direction of the boom 4. The two guide rails 53, 54 are preferably of equal length, each extending between the two axial end sections 43, 44 of the boom base body 37.

Both guide rails 53, 54 lie in the axial direction of the main axis 7, preferably at the same height as the support element 32. The support element 32 has two side faces 55, opposite one another in the direction of the boom pivoting movement 22, and on which in each case a guide structure 56 of the linear guidance device 36 is located. Each of the two guide rails 53, 54 extends next to one of the two side faces 55 of the support element 32, and is in engagement with the guide structure 56 located there, with linear movement capability.

By way of example, each guide structure 56 is comprised of two individual guide units, described as guide shoes 56a, 56b, which are arranged next to one another in the axial direction of the boom longitudinal axis 8 and in each case are in simultaneous engagement with the respectively assigned guide rail 53, 54.

The guiding engagement between the guide structures 56 and the guide rails 53, 54 forms in each case a slide bearing or an anti-friction bearing. For example, recirculating ball guides may be provided here. At any rate, the guiding engagement is chosen so that the boom base body 37, apart from mobility in the axial direction of the boom longitudinal axis 8, has no freedom of movement relative to the support element 32, but in all other directions is supported immovably by the support element 32.

In the Figures of the drawing, the boom 4 is shown adopting a first axial end position in which the end effector mounting interface 12 has a maximum distance from the main axis 7 and in which the boom 4 extends on one side beyond the boom support 3. The first axial end section 43 of the boom base body 37 lies at the same time in the area of the boom support base body 17.

As part of the boom linear movement 23, the boom 4 may be so moved that it extends with both axial end sections 43, 44, subsequently also described as boom end sections 43, 44, beyond the boom support 3, as indicated by dot-dash lines in FIG. 8.

For the generation of the boom pivoting movement 22, two drive wheels 57, 58 are mounted rotatably, independent of one another, on the boom support base body 17. For better distinction, the two drive wheels 57, 58 are also described below as first drive wheel 57 and second drive wheel 58. The drive wheels 57, 58 are aligned coaxial to one another, with their central longitudinal axis coinciding in each case with the main axis 7. Preferably and by way of example, the two drive wheels 57, 58 are axially consecutive.

The first drive wheel 57 rests by way of example below the second drive wheel 58 in the direction of the base unit 5.

By way of example, the two drive wheels 57, 58 encompass the bearing support 34, which extends upwards from a preferably plate-shaped base section 62 of the boom support base body 17. The base section 62 radially overhangs the bearing support 34 all round.

Expediently each drive wheel 57, 58 is rotatably mounted on the boom support base body 17 by a separate anti-friction bearing 63, 64. For better distinction, the anti-friction bearing 63 provided to support the first drive wheel 57 is designated as the second anti-friction bearing 63 and the anti-friction bearing 64 provided to support the second drive wheel 58 is designated as the third anti-friction bearing 64.

Each anti-friction bearing 63, 64 expediently encompasses the assigned drive wheel 57, 58 coaxially on the outer periphery, wherein with its inner ring it abuts the relevant drive wheel 57, 58 and rests with its outer ring on the boom support base body 17 which, for simplified fitting of the anti-friction bearings 63, 64, is preferably formed in several parts.

Preferably the two drive wheels 57, 58 are stepped on their axially facing end faces, wherein they axially engage a short distance into one another. Each drive wheel 57, 58 is rotatable relative to the boom support base body 17, independently of the other drive wheel 58, 57.

The first drive wheel 57 has on its radial outer periphery a first drive structure 65. The second drive wheel 58 has on its radial outer periphery a second drive structure 66. The first drive structure 65 lies on a first circle line 65a coaxial to the main axis 7, and the second drive structure 66 lies on a second circle line 66a coaxial to the main axis 7. Each drive structure 65, 66 is preferably annular and extends peripherally all around the assigned drive wheel 57, 58. The diameters of the two drive structures 65, 66 are preferably identical to one another.

Both drive structures 65, 66 are expediently in the form of teeth, which applies to the illustrated embodiment. By way of example, both drive wheels 57, 58 are in the form of gearwheels, with an outer tooth system 69 forming the respective drive structure 65, 66. The teeth are in particular spur teeth.

Each drive wheel 57, 58 may be driven to rotate by the boom drive unit 25. In this way, the first drive wheel 57 may be driven to a first driving rotary movement 67 indicated by a double arrow, and the second drive wheel 58 to a second driving rotary movement 68, similarly indicated by a double arrow. Each driving rotary movement 67, 68 is possible either in a first direction of rotation 72 or in a second direction of rotation 73 opposite the former, i.e. both clockwise and anti-clockwise. In the illustrated embodiment, the sense of direction of the first directions of rotation of the two driving movements 67, 68 is identical, and therefore also the sense of direction of the respectively opposite second directions of rotation 73.

To receive the necessary drive torque, the first drive wheel 57 has a first inner tooth system 74 coaxial to the main axis 7, and the second drive wheel 58 is provided on its inner periphery with a second inner tooth system 75, likewise coaxial to the main axis 7. The two drive wheels 57, 58 are for this purpose preferably in the form of hollow wheels.

The two drive units 26, 27 extend from the lower side 28 into the drive wheel assembly, wherein the first drive unit 26 is coupled to the first inner tooth system 74, and the second drive unit 27 to the second inner tooth system 75, for drive purposes in both cases. For the drive coupling, by way of example each drive unit 26, 27 has an output pinion 76 which may be driven to rotate both clockwise and anti-clockwise, and which meshes with the assigned inner tooth system 74, 75.

On actuation of a drive unit 26, 27, its output pinion 76 is driven to rotate, resulting in the first or second driving rotary movement 67, 68 on account of the meshing engagement with one of the two inner tooth systems 74, 75.

In the illustrated embodiment, each drive unit 26, 27 has an electric motor 77 with an output shaft 78 on which the associated output pinion 76 rests.

To control operation of the boom drive unit 25, the boom working device 1 expediently contains an electronic control unit 82 which, by way of example, is connected electrically to the two drive units 26, 27. The two drive units 26, 27 may be controlled by the electronic control unit 82 not only to execute the driving rotary movements 67, 68, but also for non-rotatable stopping of the rotary movement in order to hold the assigned drive wheel 57, 58 for as long as desired in a non-rotatable manner relative to the boom support base body 17. Expediently, each drive unit 26, 27 is assigned an encoder, with the aid of which the rotary position of the output pinion 76 may be detected, so that each drive wheel 57, 58 may be rotated as desired and positioned at the exact rotary angle.

To generate the boom pivoting movement 22, the two drive wheels 57, 58 cooperate via their drive structures 65, 66, in each case with one of two linear output structures 83, 84 of the boom 4 which for better distinction, are also described as first output structure 83 and second output structure 84. This cooperation consists, by way of example, of a meshing engagement which results from the fact that the two output structures 83, 84 are in the form of rack-like teeth systems 89 which are in meshing engagement with the outer tooth system 69 of the respectively assigned drive wheel 57, 58, functioning as drive structure 65, 66.

According to an embodiment which is not illustrated, the linear output structures 83, 84 may be integral parts of the boom base body 37. To obtain good strength it is however advantageous for each of the two linear output structures 83, 84 to be formed on one of two racks 85, 86, which are fixed to the boom base body 37 by suitable mounting means.

Each rack 85, 86 may be made as one piece, or multi-part out of several rack sections attached axially to one another.

In the case of a boom base body 37 in the form of a hollow body, as is the case here by way of example, the two linear output structures 83, 84 are preferably located together with the guide rail assembly 52 in the base body interior 38. Each output structure 83, 84 is mounted on one of the two inner faces 47, 48 of the side walls 45, 46.

The two linear output structures 83, 84 extend parallel to the boom longitudinal axis 8.

Figure 5:
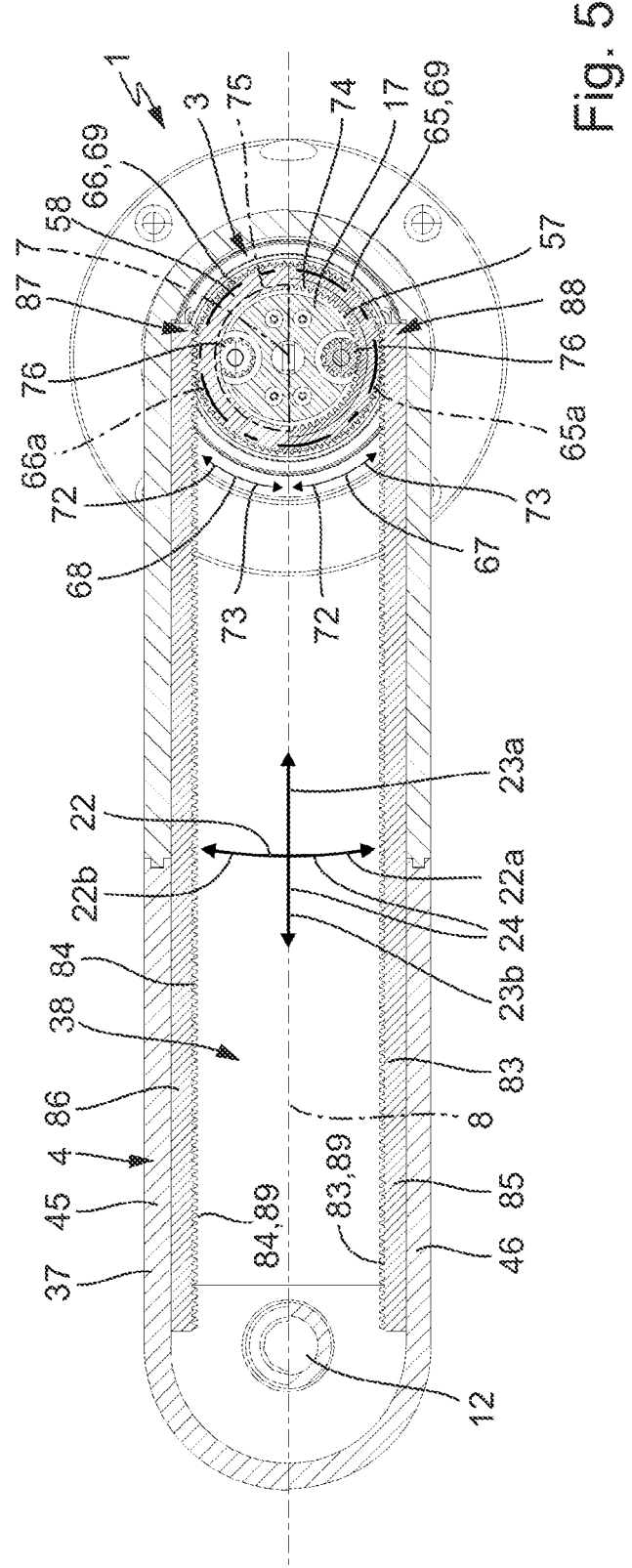
FIG. 5 a longitudinal section according to the stepped section line V-V of FIG. 2
Figure 6:
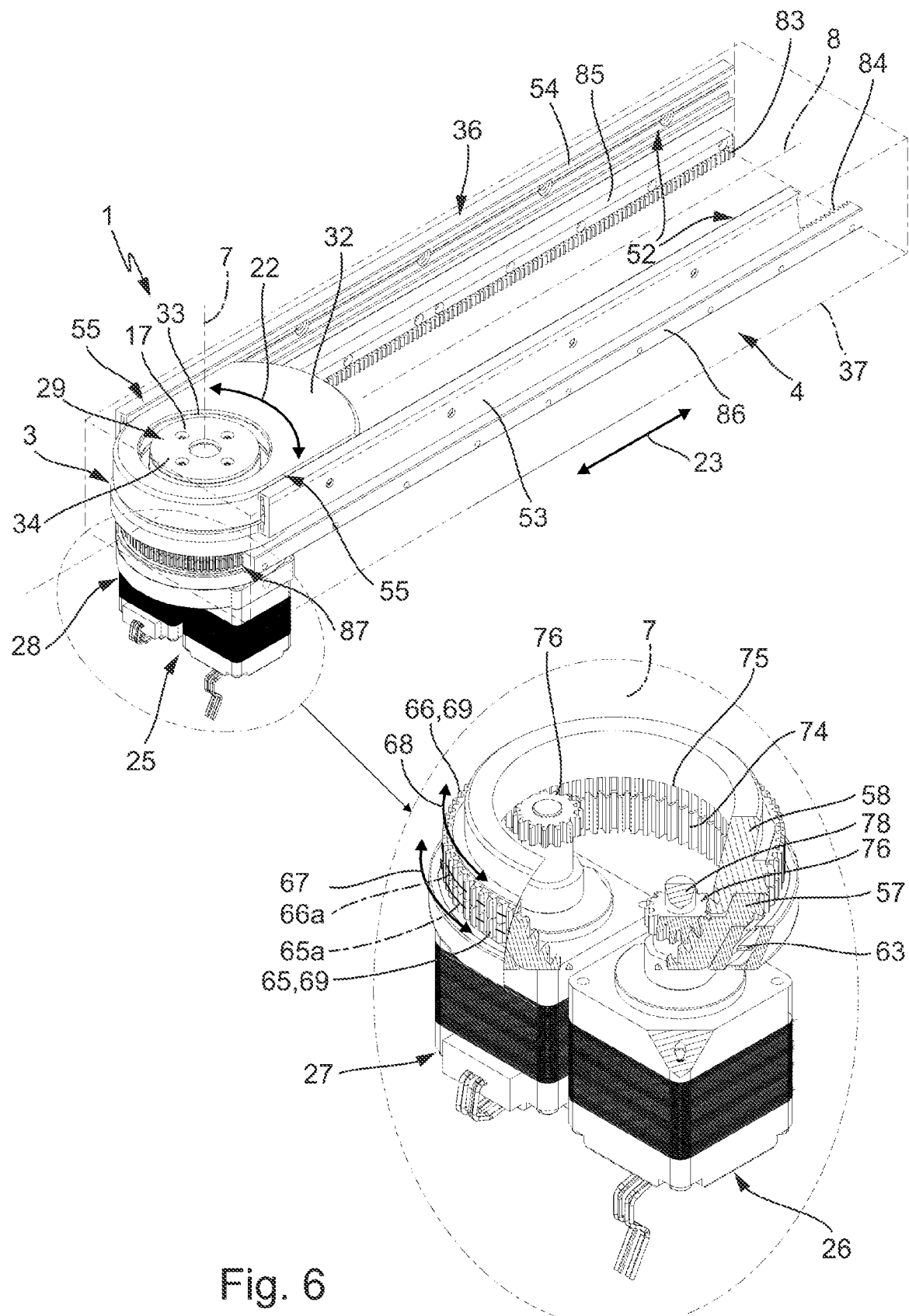
FIG. 6 a detail view of the boom of FIGS. 1 to 5, in which a boom base body is indicated only by broken lines and in which an area surrounded by dot-dash lines is also illustrated separately further enlarged and broken up, and FIGS. 7 to 9 different options for executing the operating movement, each in a sectional view according to FIG. 5 wherein there is indicated by dot-dash lines in each case a different operating position of the boom which may be reached through the operating movement.

The two linear output structures 83, 84 extend in the manner of a tangent past the drive structure 65, 66 cooperating with it, wherein the first output structure 83 is in force-transmitting engagement at a first engagement area 87 with the first drive structure 65, and the second output structure 84 is in force-transmitting engagement in a second engagement area 88 with the second drive structure 66. The two engagement areas 87, 88 are, as is well indicated in FIG. 5, assigned diametrically opposite outer peripheral areas of the two drive wheels 57, 58.

However, the two output structures 83, 84 are offset to one another in the axial direction of the main axis 7, with the offset corresponding to the axial offset of the two drive structures 65, 66 of the drive wheels 57, 58. This may be seen clearly in FIG. 3.

Accordingly, the drive structures 65, 66 of the two drive wheels 57, 58 lie in adjacent planes in the axial direction of the main axis 7, which also applies to the two output structures 83, 84. The said planes extend parallel to the working plane 18. In other words, on the one hand the two drive structures 65, 66 and on the other hand the two output structures 83, 84 are in each case arranged offset to one another in the axial direction of the main axis 7.

Depending on the momentary direction of rotation of a drive wheel 57, 58, the first or second linear output structure 83, 84 in engagement with it is driven to a linear movement in the axial direction of the boom longitudinal axis 8 in either the first linear direction 23a or the second linear direction 23b. Depending on the relationship in which the two drive wheels 57, 58 are rotated relative to one another, this leads to an operating movement 24 which is a pure boom linear movement 23 or a pure boom pivoting movement 22 or a combined linear and pivoting movement resulting from a superimposition of the boom linear movement 23 and the boom pivoting movement 22.

Figure 7:
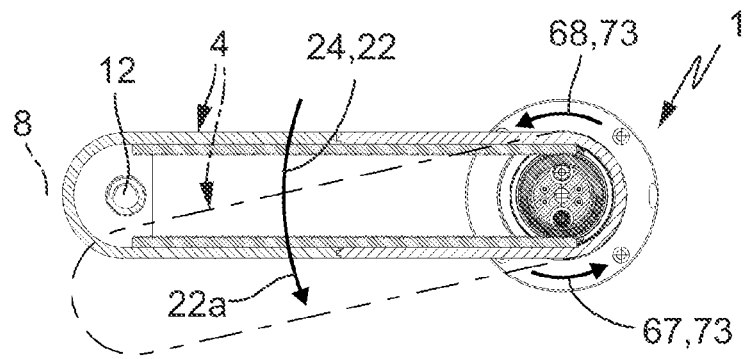
Figure 8:
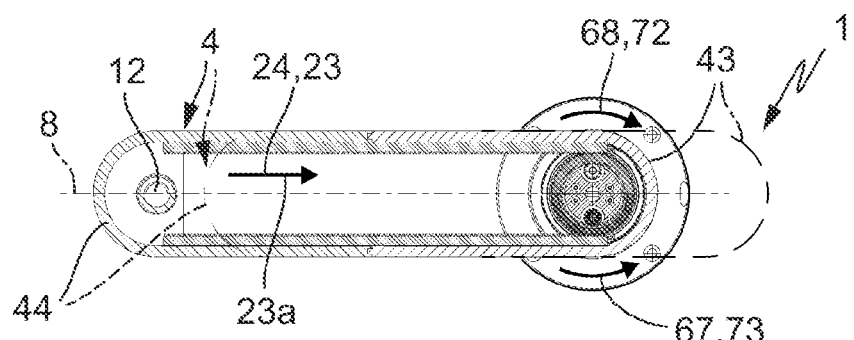
Figure 9:
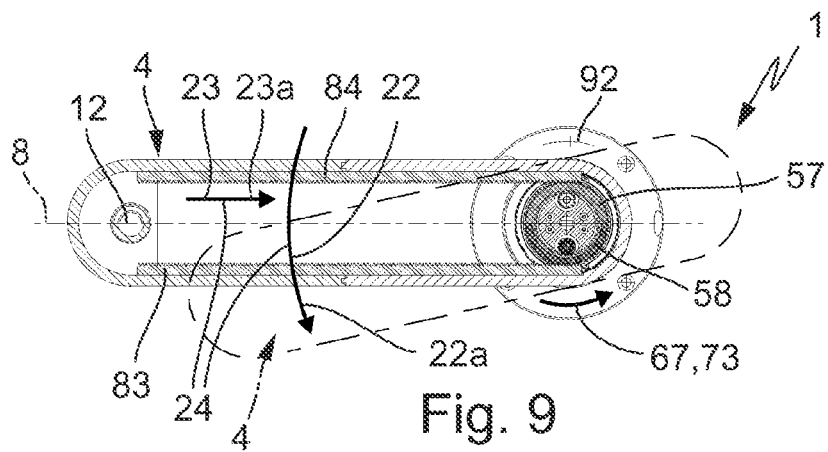

Illustrated in FIGS. 7 to 9 are various possible operating phases of the boom working device 1, from which emerge several of many possible variants of the operating movement 24 of the boom 4.

In the operating phase of FIG. 7, the two drive wheels 57, 58 are driven simultaneously and at the same speed to make driving rotary movements 67, 68 in the same direction in the second direction of rotation 73, resulting in an operating movement 24 consisting solely of a pure boom pivoting movement 22 oriented in the first pivoting direction 22a.

The operating phase of FIG. 8 shows drive wheels 57, 58 driven in the opposite direction, wherein the first drive wheel 57 makes a first driving rotary movement 67 in the second direction of rotation 73 and the second drive wheel 58 makes a second driving rotary movement 68 in the first direction of rotation 72. The speeds of rotation are identical. This results in an operating movement 24, which consists solely of a boom linear movement 23 in the first linear direction 23a.

In the operating phase of FIG. 9, the first drive wheel 57 executes a first driving rotary movement 67 in the second direction of rotation 73, while the second drive wheel 58 is held non-rotatable, as indicated by a stop symbol at 92. This drive configuration generates a boom linear movement 23 in the first linear direction 23a and at the same time a boom pivoting movement 22 in the first pivoting direction 22a, so that the operating movement 24 results from superimposition of the two aforementioned movements.

To stop the boom 4 in a desired operating position, both drive wheels 57, 58 are locked non-rotatably by the boom drive unit 25.

Different speeds of rotation of the two drive wheels 57, 58 result in different types of superimposition of the boom pivoting movement 22 and the boom linear movement 23 as operating movement 24.

An advantageous optional equipping of the boom working device 1 facilitates varying the position of the working plane 18 in the axial direction of the vertical axis 17, and specifically in particular infinitely. In this way, the working range of the end effector 15 attached to the end effector mounting interface 12 may be spatially expanded.

By way of example, this equipment option is obtained by making the boom support 3 capable of linear movement on the base unit 5 in such a way that it is able to execute a linear stroke movement 93, indicated by a double arrow, in the axial direction of the main axis 7 relative to the base unit 5. The stroke movement 93 is possible in both axial directions. In the exemplary operating mode, the stroke movement 93 is oriented vertically.

The stroke movement 93 relates to the whole operating unit 2. In the course of the stroke movement 93, therefore, not only the boom 4 but also the boom support 3 is shifted and positioned as desired in the axial direction of the main axis 7.

For an exact stroke movement 93, the boom support 3 is movably mounted on the base unit 5 in the axial direction of the main axis 7. The movable mounting is achieved by way of example by means of a bearing tube 94 of the boom support 3, which is fixed to the boom support base body 17 and extends downwards coaxial to the main axis 7.

The bearing tube 94 dips into the interior 95 of a tubular bearing extension 96, open at the end and towards the top, which is part of the base unit 5. By means of an anti-twist lock device 95, the bearing tube 94 and therefore the whole boom support 3 is fixed non-rotatably with regard to the base unit 5, without restricting stroke mobility.

A boom support drive unit 97 belonging to the base unit 5 cooperates with the bearing tube 94 to generate the stroke movement 93. By way of example, the boom support drive unit 97 is in the form of a spindle drive unit and has a drive motor 98 by which a threaded spindle 99 extending coaxial to the main axis 7 in the direction of the boom support base body 17 may be driven to rotate bi-directionally in accordance with double arrow 101, while a spindle nut 100 connected to the bearing tube 94 rests non-rotatably on its external thread.

Through rotation of the threaded spindle 99 generated by the drive motor 98, the spindle nut 100 including the bearing tube 94 fastened to it may be moved in the axial direction of the main axis 7, resulting in the stroke movement 93 of the operating unit 2.

The boom support drive unit 97 is expediently connected electrically to the electronic control unit 82, which is therefore in a position to control not only the operating movement 24 of the boom 4 but also the stroke movement 93 of the whole operating unit 2.

What is claimed is:

1. A boom working device comprising a boom support having a main axis, and a boom having at least one end effector mounting interface and extending along a boom longitudinal axis orthogonal to the main axis, wherein the whole boom is pivotable, in a working plane orthogonal to the main axis relative to a boom support base body of the boom support, while executing a boom pivoting movement around the main axis as pivoting centre, and with a boom drive unit to generate an operating movement of the boom relative to the boom support in the working plane, wherein the whole boom is linearly traversable in the working plane relative to the boom support base body, while executing a boom linear movement in the axial direction of the boom longitudinal axis, wherein, on the boom support base body, two first and second drive wheels of the boom support, coaxial to the main axis, are rotatably mounted in a manner rotatable with respect to the boom support base body around the main axis as rotation axis, wherein the first drive wheel has on its outer periphery a first drive structure lying on a circle line coaxial to the main axis and the second drive wheel has on its outer periphery a second drive structure lying on a circle line coaxial to the main axis, wherein the boom has two linear first and second output structures extending parallel to the boom longitudinal axis, wherein the first output structure, in a first engagement area, is in force-transmitting engagement with the first drive structure, and wherein the second output structure, in a second engagement area, is in force-transmitting engagement with the second drive structure, wherein the first engagement area and the second engagement area are assigned to diametrically opposite outer peripheral areas of the two drive wheels, and wherein the two drive wheels are drivable by the boom drive unit, independently of one another, respectively to a driving rotary movement in a first direction of rotation and in a second direction of rotation opposite to the first direction of rotation, and may be held non-rotatably in any desired rotary position, by which means the operating movement of the boom is generatable, said the operating movement consisting either of the boom pivoting movement alone or of the boom linear movement alone or being composed of the boom pivoting movement and of the simultaneously superimposed boom linear movement.

2. The boom working device according to claim 1, wherein the drive structures of the two drive wheels and the linear output structures of the boom in engagement with them are each arranged offset to one another in the axial direction of the main axis.

3. The boom working device according to claim 1, wherein the two drive structures and the two linear output structures are in the form of tooth systems engaging in one another.

4. The boom working device according to claim 3, wherein the two linear output structures of the boom are formed on racks of the boom.

5. The boom working device according to claim 3, wherein the two drive wheels of the boom support are in the form of gearwheels.

6. The boom working device according to claim 1, wherein the boom drive unit has first and second drive units electrically and/or fluidically operable independently of one another, wherein the first drive unit is for driving purposes coupled to the first drive wheel, and the second drive unit is for driving purposes coupled to the second drive wheel.

7. The boom working device according to claim 6, wherein each of the two drive wheels has an inner tooth system, coaxial to the main axis of the boom support, with which the respectively assigned drive unit is in meshing engagement.

8. The boom working device according to claim 6, wherein the two drive units are mounted on the boom support base body.

9. The boom working device according to claim 1, wherein the boom, via a linear guidance device participating in the boom pivoting movement, is mounted linearly displaceable relative to the boom support perpendicular to the main axis.

10. The boom working device according to claim 9, wherein the boom support has a support element, rotatably mounted on the boom support base body, in a manner independent of the two drive wheels, with the main axis as rotation axis.

11. The boom working device according to claim 10, wherein the boom has a guide rail assembly of the linear guidance device which is in engagement with guide structures located on the support element in a manner linearly movable in the axial direction of the boom longitudinal axis.

12. The boom working device according to claim 11, wherein the guide rail assembly has two guide rails, each extending parallel to the boom longitudinal axis and being spaced apart from one another in the direction of extension of the working plane, each being in engagement, with linear movement capability, with at least one guide shoe belonging to the guide structures and firmly attached to the support element.

13. The boom working device according to claim 1, wherein the boom has an elongated boom base body, on which the at least one end effector mounting interface is located.

14. The boom working device according to claim 13, wherein the at least one end effector mounting interface is located on one of the two long sides of the boom base body oriented in the axial direction of the main axis.

15. The boom working device according to claim 13, wherein the boom base body is a hollow body, in the interior of which the two linear output structures are arranged.

16. The boom working device according to claim 15, wherein the boom base body is hood-like in form with a slit-like opening through which the boom support extends.

17. The boom working device according to claim 13, wherein the boom has a guide rail assembly of the linear guidance device which is in engagement with guide structures located on the support element in a manner linearly movable in the axial direction of the boom longitudinal axis, wherein the guide rail assembly is fastened to the boom base body.

18. The boom working device according to claim 1, wherein the boom has first and second boom end sections, opposite one another in the axial direction of the boom longitudinal axis and is able to traverse between two axial end positions in which in each case one of the two boom end sections is positioned in the area of the boom support.

19. The boom working device according to claim 18, wherein at least one end effector mounting interface is located in the area of one of the two boom end sections.

20. The boom working device according to claim 1, further comprising a base unit on which the boom support is mounted to execute a stroke movement in the axial direction of the main axis, and that it has a boom support drive unit through which the boom support together with the boom is drivable for executing the stroke movement and is positionable in different stroke positions.

21. The boom working device according to claim 1, further comprising an electronic control unit to which the boom drive unit and the optionally provided boom support drive unit is connected.

* * * * *